(12) United States Patent
Nakar

(10) Patent No.: US 12,411,964 B2
(45) Date of Patent: Sep. 9, 2025

(54) SECURING DATA LAKES VIA OBJECT STORE MONITORING

(71) Applicant: Imperva, Inc., San Mateo, CA (US)

(72) Inventor: Ori Nakar, Givat Shemuel (IL)

(73) Assignee: Imperva, Inc., San Mateo, CA (US)

( * ) Notice: Subject to any disclaimer, the term of this patent is extended or adjusted under 35 U.S.C. 154(b) by 602 days.

(21) Appl. No.: 17/523,720

(22) Filed: Nov. 10, 2021

(65) Prior Publication Data

US 2023/0142344 A1    May 11, 2023

(51) Int. Cl.
   *G06F 21/62* (2013.01)
   *G06F 16/23* (2019.01)

(52) U.S. Cl.
   CPC ...... *G06F 21/6218* (2013.01); *G06F 16/2358* (2019.01); *G06F 2221/2101* (2013.01)

(58) Field of Classification Search
   CPC .................. G06F 21/6218; G06F 16/2358
   USPC .......................................................... 726/26
   See application file for complete search history.

(56) References Cited

U.S. PATENT DOCUMENTS

| | | | | |
|---|---|---|---|---|
| 2010/0111094 | A1* | 5/2010 | Tanikawa | H04L 67/61 370/401 |
| 2015/0310215 | A1* | 10/2015 | McBride | G06F 21/577 726/25 |

* cited by examiner

*Primary Examiner* — Anthony D Brown

(57) ABSTRACT

Embodiments of the present disclosure provide a method for detecting security incidents in an object store by aggregating log files generated by a monitoring program of the object store and monitoring the aggregated log data. A processing device may periodically execute database operations to access data stored in the object store. In response to each database operation, an access log set may be generated and stored in an access log storage. The processing device may periodically aggregate access log data from a plurality of access log sets currently stored in the access log storage to generate aggregated log data. The processing device may then monitor the aggregated log data over time to identify one or more security incidents of the object store.

14 Claims, 8 Drawing Sheets

| Time | user | source | Bucket | key | Bytes Transferred |
|---|---|---|---|---|---|
| 1:00 | arn:aws:iam::446351906296:user/impv-user11 | athena.amazonaws.com | my-bucket | tables/my_table/day=2021-06-10/event_type=1/obj_x.parquet | 0.1k |
| 1:00 | arn:aws:iam::446351906296:user/impv-user11 | athena.amazonaws.com | my-bucket | tables/my_table/day=2021-06-10/event_type=2/obj_y.parquet | 1.1k |

| Time | Prefix | user | Source | Partitions | Sub Partitions | Events | Bytes Transferred |
|---|---|---|---|---|---|---|---|
| 10:01 | tables/my-table | arn:aws:iam::446351906296:user/impv-user11 | athena.amazonaws.com | 2021-06-10 | 1, 2, 7 | 11,023 | 20MB |
| | | | | | | | |
| | | | | | | | |

SECURING DATA LAKES VIA OBJECT STORE MONITORING

TECHNICAL FIELD

Aspects of the present disclosure relate to enterprise database systems, and more particularly, to identifying and mitigating security threats in enterprise database systems.

BACKGROUND

Database systems may include a data repository and a database server that implements an access control system which regulates access to the data stored in the data repository. A data repository may refer to any appropriate storage system such as an object storage system (e.g., the Amazon S3™ system), a database, a filesystem, and a cloud storage layer, for example. Access may be granted only to those people (database system users) who are allowed to access such data and access may be restricted to unauthorized persons. Database systems may include a data lake comprising a number of different data repositories and in such scenarios, the database server may include an access control system having an access control layer for each data repository the data lake is comprised of Database systems may also implement monitoring programs such as Amazon's Cloudtrail™ tool which may track user activity and application program interface (API) usage across various regions and accounts of a data lake.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a diagram illustrating example access log entries, in accordance with some embodiments of the present disclosure.

DETAILED DESCRIPTION

Figure 1:
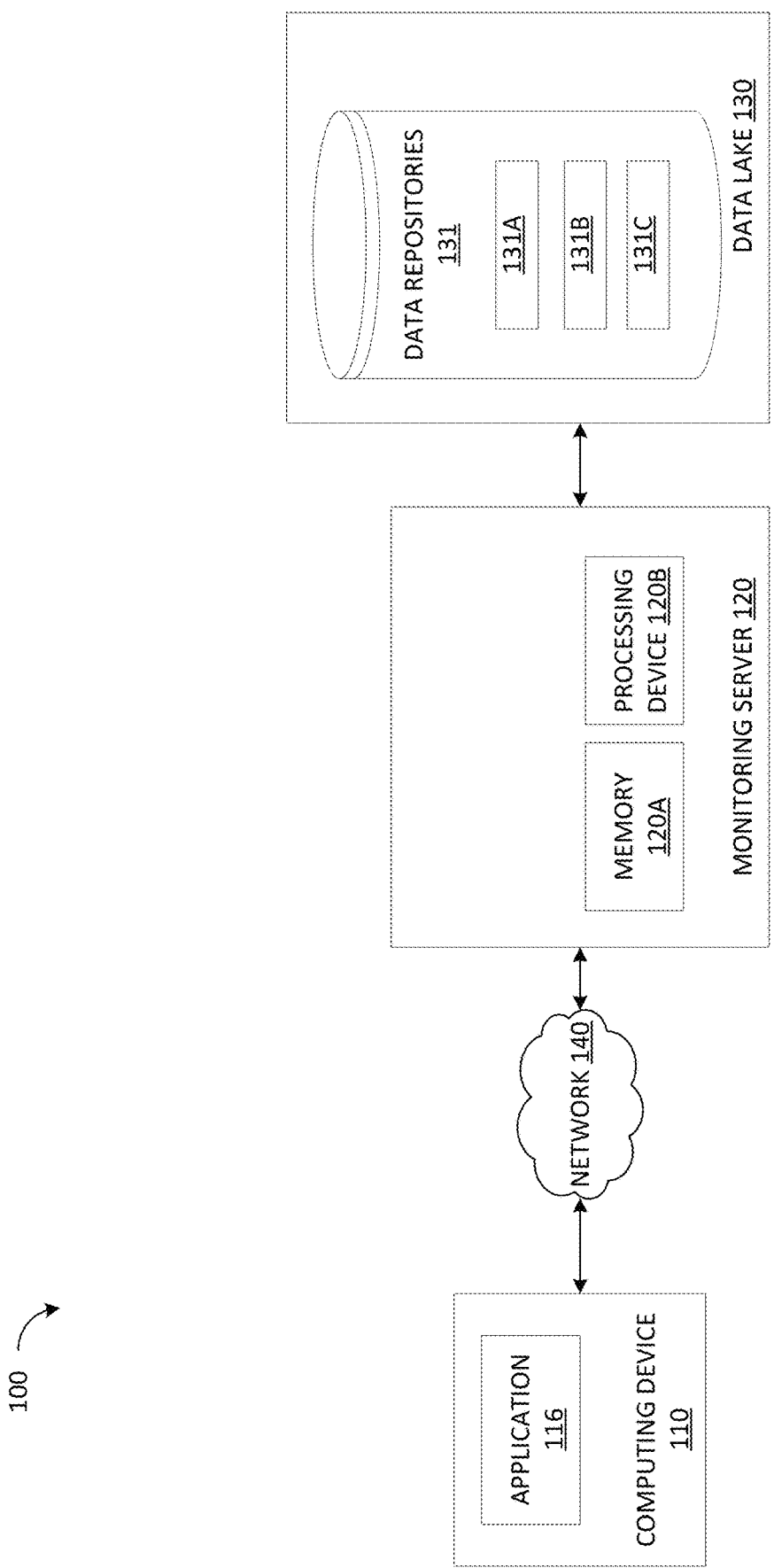
FIG. 1 is a block diagram that illustrates an example system, in accordance with some embodiments of the present disclosure.

Data lakes (also referred to as object stores) are becoming increasingly popular because they offer significant flexibility and cost effectiveness. Data lakes can scale to large sizes and support a variety of ways to access the data stored therein. For example, data lakes can be accessed via an API, a data query engine, and cloud services, among others. Examples of such cloud services include Python tools like Pandas which can be used to run queries on the data lake, as well as object store capabilities like the Amazon S3 Select™ tool. However, this size and flexibility also makes it difficult to monitor and detect possible security risks in data lakes such as security misconfigurations and bad practices that may result in security incidents and security breaches. Although tools exist that can be used to monitor query engines and analyze SQL queries over time (e.g., diameter routing agent (DRA)), query engines are decoupled from the data in data lake architectures. As a result, monitoring a query engine will not provide a complete security solution.

Some data lake security tools include monitoring programs that may track user activity and application program interface (API) usage across various regions and accounts of a data lake and allow a user to collect access logs of this activity from an object store. However, this is not an easy task due to the large scale of the access logs generated by the monitoring program. A simple query such as counting the number of records in a table may cause thousands of object access operations and monitoring a single data lake table for a short period of time can easily result in billions of access log records. To identify an access event (e.g., a query by a query engine), access log records need to be correlated in a way that will provide qualitative metrics for monitoring the data lake.

The present disclosure addresses the above-noted and other deficiencies by using a processing device to detect security incidents in a data lake by aggregating log files generated by a monitoring program of the data lake and monitoring the aggregated log data. The processing device may periodically execute database operations to access data stored in a data lake. A database operation may refer to a wide variety of interactions with data stored in a data lake including reading, modification, or deletion of data among others. In response to each database operation, the processing device may generate an access log set and store the access log set in an access log storage. Access logs may be generated using a monitoring program which may record object-level API activity, and generate detailed access log files. The processing device may periodically aggregate access log data from a plurality of access log sets currently stored in the access log storage to generate aggregated log data. The access log data may be aggregated based on a variety of different characteristics of the access log data such as a user who made a database operation, a source from which the database operation was made, a time at which the database operation was made, and what data was accessed during the database operation, among others. The processing device may then monitor the aggregated log data over time to identify one or more security incidents and potential security vulnerabilities of the data lake.

FIG. 1 is a block diagram that illustrates an example system 100. As illustrated in FIG. 1, the system 100 includes computing device 110, monitoring server 120, data lake 130 and a network 140. The computing device 110 and the monitoring server 120 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 110 and monitoring server 120. In some embodiments, the computing device 110 may communicate with the data lake 130 directly via the network 140. The data lake 130 may comprise data repositories 131A-131C. The computing device 110, monitoring server 120, and data lake 130 may each include hardware such as processing device 120B (e.g., processors, central processing units (CPUs)), memory 120A (e.g., random access memory (RAM), storage devices (e.g., hard-disk drive (HDD)), and solid-state drives (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The data repositories 131 may comprise one or more storage devices for storing data.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 110 and monitoring server 120 may each comprise any suitable type of computing device or machine that has a programmable processor including, for example, server computers, desktop computers, laptop computers, tablet computers, smartphones, set-top boxes, etc. In some examples, the computing device 110, monitoring server 120, and data lake 130 may each comprise a single machine or may include multiple interconnected machines (e.g., multiple servers configured in a cluster). The computing device 110, monitoring server 120, and data lake 130 may be implemented by a common entity/organization or may be implemented by different entities/organizations. For example, computing device 110 may be operated by a first company/corporation and data lake 130 may be operated by a second company/corporation. The computing device 110, monitoring server 120, and data lake 130 may each execute or include an operating system (OS), as discussed in more detail below. The OSs of computing device 110, monitoring server 120, and data lake 130 may manage the execution of other components (e.g., software, applications, etc.) and/or may manage access to the hardware (e.g., processors, memory, storage devices etc.) of the computing device.

As illustrated in FIG. 1, computing device 110 may run an application 116 which may allow a user to interact with data lake 130. When the user wants to access the data lake 130, they may utilize application 116 (which may be e.g., a client w/ a graphical user interface (GUI)) to connect to the data lake 130 via the monitoring server 120, and make calls to the data repositories 131 (e.g., queries). In some embodiments, the application 116 may interact with the data lake 130 directly. The application 116 may interact with monitoring server 120 which employs one or more network links (not shown) for accessing the data repositories 131. The data lake 130 may comprise multiple data repositories 131 of different types such as an object storage system, a database, a filesystem, or a cloud storage layer, for example. The monitoring server 120 may include an access control system (not shown) which may include an individual access control layer, entitlement model, data model, etc. for each data repository 131, which may all differ from one another. The access control system may regulate access to the data stored in data lake 130 only to those people who are allowed to access such data and restrict access to unauthorized persons using any appropriate access control method e.g., Role Based Access Control (RBAC).

Figure 2:
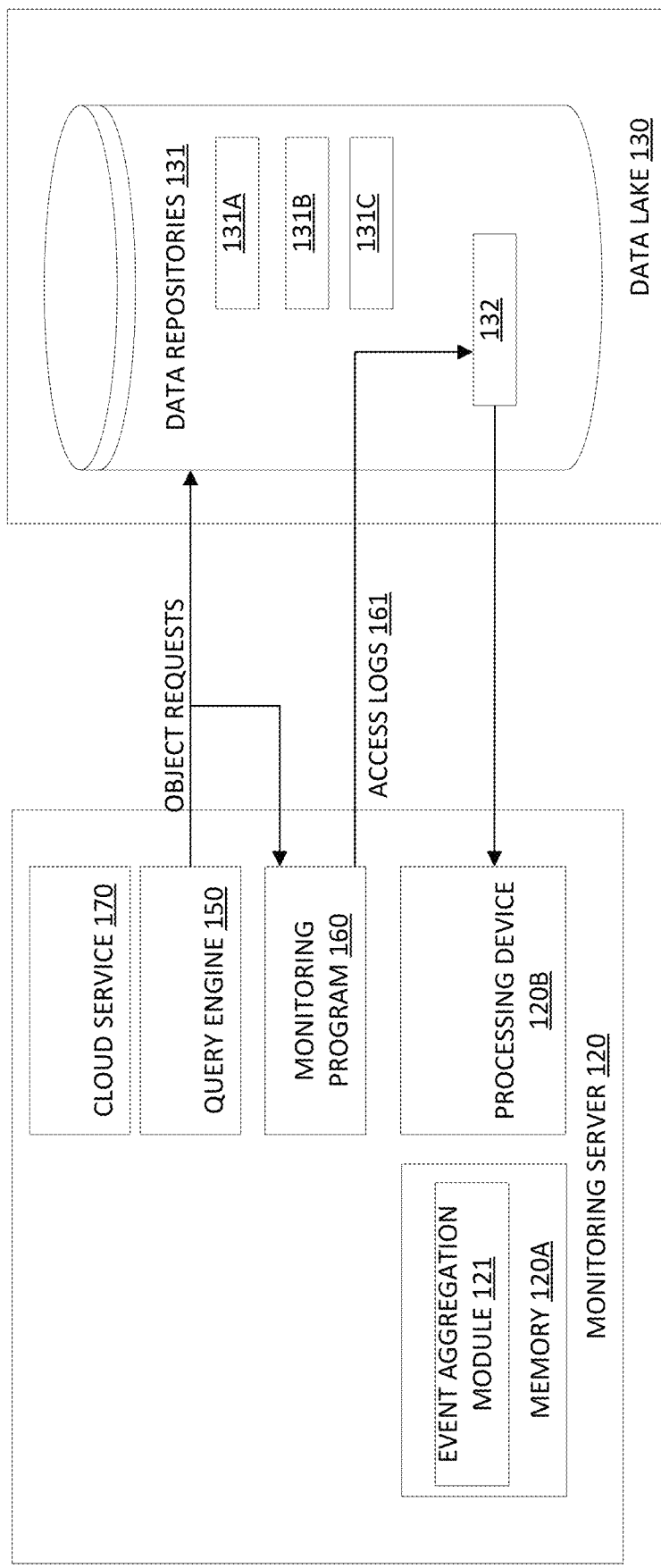
FIG. 2 is a block diagram that illustrates an example data lake, in accordance with some embodiments of the present disclosure.

As discussed herein, the size, flexibility, and usage of data stored in the data lake 130 increases the scale of the access logs and makes it difficult to monitor and detect possible security risks in data lakes including security misconfigurations and bad practices that may result in security incidents and security breaches. FIG. 2 illustrates the monitoring server 120 and the data lake 130 in accordance with some embodiments of the present disclosure. The monitoring server 120 may further include a query engine 150 and cloud service 170 which may execute database operations and a monitoring program 160 which may track user activity and API usage across various regions and accounts of the data lake 130. The monitoring program 160 may record object-level API activity, and generate detailed access log files (also referred to herein and shown as access logs 161 in FIG. 2) that provide log data about each database operation (e.g., a query) executed such as a user who made the query, a source from which the query was made, a time at which the query was made, and what data was accessed, among other details as discussed in further detail with respect to FIG. 3. The monitoring program 160 may store the access logs 161 (also referred to herein as an access log set) within an access log storage 132 (e.g., an Amazon S3 bucket). The data in the data lake 130 may be hierarchical. For example, each data repository 131 may comprise a logical grouping of schemas and each schema may comprise a logical grouping of database objects (tables, views, etc.). Partitions may be sub folders of tables, in which data is organized inside of the data lake 130 and are among the most effective ways to reduce query time and costs associated with a data lake. Data may be saved according to partitions and in response to a query, the query engine 150 may scan only the relevant partitions—for example the last 7 days of data, or events of a specific type.

The monitoring program 160 may allow a user to define different types of partitions for the purposes of aggregating access log data (discussed in further detail herein). Example partition types may include sequential partitions (e.g., date, time) and discrete partitions (e.g., event type partitions, which may be one type of a static list of types with rare changes). A discrete partition may comprise a fixed set of values (unlike time periods such as days where in each day there will be new values). The fixed set does not change or changes rarely, and is dependent on the data. For example, if events are stored and a user wishes to query them by type, the events can be stored by event type partitions. In this way, if a cloud WAF has 15 different attack types, a user has the option to query only a single attack type. In addition, a first partition may be defined with a particular type (e.g., sequential), and sub-partitions of the first partition may be defined with a different type (e.g., discrete). The memory 120A may store an event aggregation module 121 which may be executed by the processing device 120B in order to perform the event aggregation and other functions described herein.

FIG. 3 illustrates access logs 300 (which may be an example of the access logs 161 of FIG. 2) generated by the monitoring program 160 in response to a database operation. In the example of FIG. 3, a table stored in the data lake 130 may be stored under the prefix "tables/my-table" with a sequential partition corresponding to events that occurred on a particular day (day=2021-06-10) and discrete sub-partitions corresponding to events of particular types (event_type=1, event_type=2). The first access log entry 301 includes log data indicating that the database operation was initiated by a user (identified in FIG. 3 as "impv-user11") and as part of the database operation, the user accessed an event sub-partition of the day partition (tables/my_table/day=2021-06-10/event_type=1/obj_x.parquet) at 1:00 AM from a particular bucket (my-bucket) via a query engine "athena.amazonaws.com" (the source) and that 0.1 KB (kilobytes) was transferred during the access. The second log entry 302 includes log data indicating that the same user accessed a second event sub-partition of the day partition (tables/my_table/day=2021-06-10/event_type=2/obj_y.parquet) at 1:00 AM from the same bucket (my-bucket) and via the query engine "athena.amazonaws.com" and that 0.1 KB (kilobytes) was transferred during the access.

Referring back to FIG. 2, the processing device 120B (executing aggregation module 121) may aggregate log data from the access logs 161 currently stored in the access log storage 132 (thereby generating aggregated log data) based on a variety of different characteristics of the log data within the access logs 161 such as user (e.g., user, role, or service (including micro-service)), source (e.g., query engine, cloud service) time (aggregation can be done based on events that occurred during any appropriate time interval (e.g., minutes, hours)), the operation (event cause) which ultimately informs which prefixes/partitions/sub-partitions that were accessed, and target objects of the operation, including key prefixes that can represent a data lake table and scanned partitions/sub-partitions which may provide better granularity of the data access and qualitative monitoring. In addition, when aggregating based on time, in some embodiments the processing device 120B may use a more complex method such as time based clustering which groups sequences of records with small time differences. The processing device 120B may aggregate all of the access logs 161 stored in the access log storage 132 based on any combination of the above characteristics of the log data of the access logs 161 on any appropriate basis. For example, the processing device 120B may perform the aggregation at regular intervals (e.g., 5 minutes but can be any appropriate interval), or may perform the aggregation in response to certain event_type partitions being scanned. In addition, the processing device 120B may change the aggregation between datasets. For example, the processing device 120B may decide on different time intervals to aggregate events.

Figure 4:
FIG. 4 is a diagram illustrating an example of aggregated access log data, in accordance with some embodiments of the present disclosure.

FIG. 4 illustrates an example of aggregated log data 400, in accordance with some embodiments of the present disclosure. It should be noted that the aggregated log data 400 may represent log files from a single operation/query. As shown, the processing device 120B aggregated log data from 11,023 access log entries (events) into a single event. More specifically, the processing device 120B aggregated the log data of the 11,023 events associated with a database operation directed to the "tables/my-table" prefix and was executed 10:01 AM. The aggregation was based on the source of the database operation which was the Athena query engine (Athena.amazonaws.com), and one sequential partition corresponding to events on Jun. 10, 2021 which was scanned together with 3 event_type sub-partitions (event types 1, 2, and 7). As shown in FIG. 4, 20 MB of data was transferred over the 11,023 access log entries.

Upon generating aggregated log data, the processing device 120B may monitor the aggregated log data (corresponding to events in the data lake 130) over time and identify/report on anomalies and security incidents. More specifically, the processing device 120B may monitor the following metrics over time for the different sources and targets: number of database operations, bytes transferred, number of accessed partitions, and number of unique accessed partitions/sub-partitions, users/groups of users involved, and any roles involved. In some embodiments, the processing device 120B may also or alternatively monitor the number of database operations, bytes transferred, the number of accessed partitions for specific partitions, users/groups of users involved, and any roles involved. For example, the processing device 120B may monitor access metrics to a specific event_type by a particular source, a particular user/group of users, and a particular role(s).

Figure 5A:
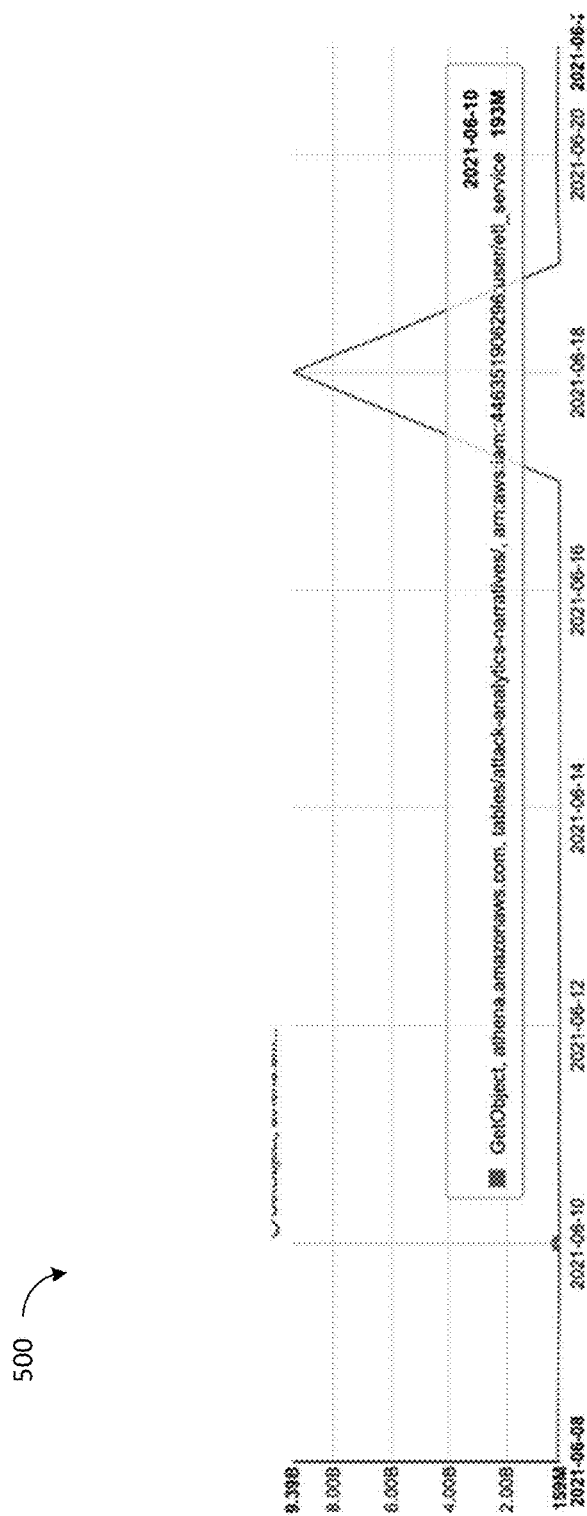
FIG. 5A is a chart illustrating bytes of data accessed by a user of a data lake over time, in accordance with some embodiments of the present disclosure.

FIG. 5A illustrates a chart 500 of the number of bytes accessed by a data lake user over a period of time from Jun. 8, 2021 to Jun. 20, 2021. In the example of FIG. 5A, the data lake user exhibits an irregular behavior in terms of the data it consumes (bytes transferred) when the bytes transferred goes up from a daily average of 159 MB to 9.4 GB. Thus, the processing device 120B may identify this as an anomaly and report it to e.g., an administrator of the data lake 130 for further investigation. However, even in normal use, the amount of data transferred may change between days, and can have peaks and drops. As such, irregularities in the amount of data transferred may not on their own be indicative of a security incident. Indeed, individual metrics on their own may not provide sufficiently accurate identification of security incidents and thus the processing device 120B may utilize any number/combination of metrics including number of database operations, bytes transferred, number of accessed partitions, and number of unique accessed partitions/sub-partitions to generate stronger indications of security incidents.

Figure 5B:
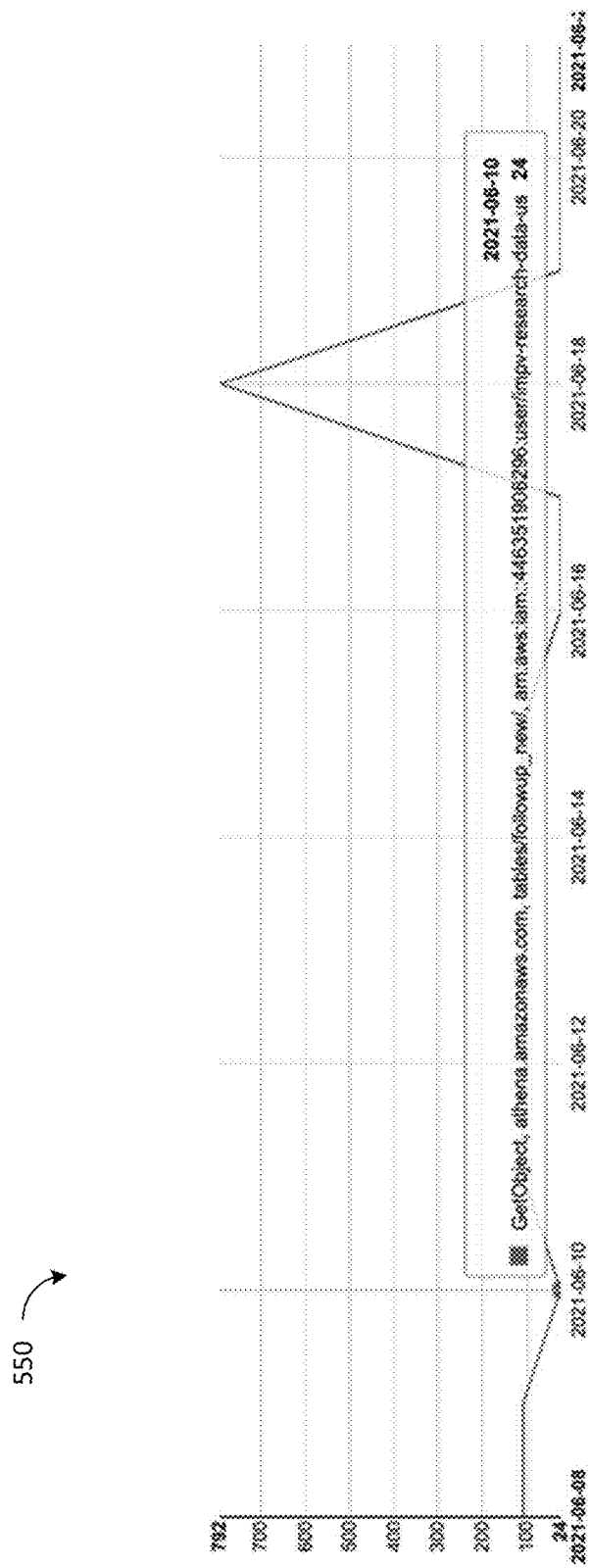
FIG. 5B is a chart illustrating unique partitions of data accessed by a user of a data lake over time, in accordance with some embodiments of the present disclosure.

FIG. 5B illustrates a chart 550 of the number of unique partitions accessed by the data lake user over a period of time from Jun. 8, 2021 to Jun. 20, 2021. In the example of FIG. 5B, a user may access 100 unique partitions per day on average, but on Jun. 18, 2021 the user may have scanned 792 unique partitions. As discussed above, while this alone may not be indicative of a security incident, the processing device 120B may monitor multiple metrics (e.g., number of unique partitions scanned in conjunction with number of bytes transferred and any other relevant metrics) to identify security incidents.

While access control methods do not account for the partition level, especially those partitions that are sequential and have dynamic names—the monitoring techniques discussed herein can detect anomalies and find security incidents in particular partitions. The processing device 120B may count the number of partitions scanned by a user, or the bytes transferred during access of specific partitions. For example, the processing device 120B may monitor a specific event_type partition to determine if there is a peak in usage in that specific event_type. Monitoring can be narrowed to specific prefixes (e.g., prefixes with sensitive data) which can alleviate scale and cost issues. If the prefixes with the sensitive data are unknown, the processing device 120B may discover them by using a crawler on the objects of the data lake 130. The partition names and types (sequential, discrete) can also be provided manually or discovered automatically.

In another example, the user may be a micro service, which is a piece of software that performs a specific limited function. An application may comprise hundreds or even thousands of micro services and thus micro services may increase the number of application "users" which access the data lake 130. Because of their limited functionality, it is easier to monitor them and detect security incidents. For example, a micro service may access the same partition (e.g., last 7 days, event types 1 and 2) multiple times over a particular time period. If it suddenly accesses a partition for the last 30 days then the processing device 120B may identify this as an anomaly, and in conjunction with other monitored data (as discussed above), determine if a security incident has been detected.

Figure 6:
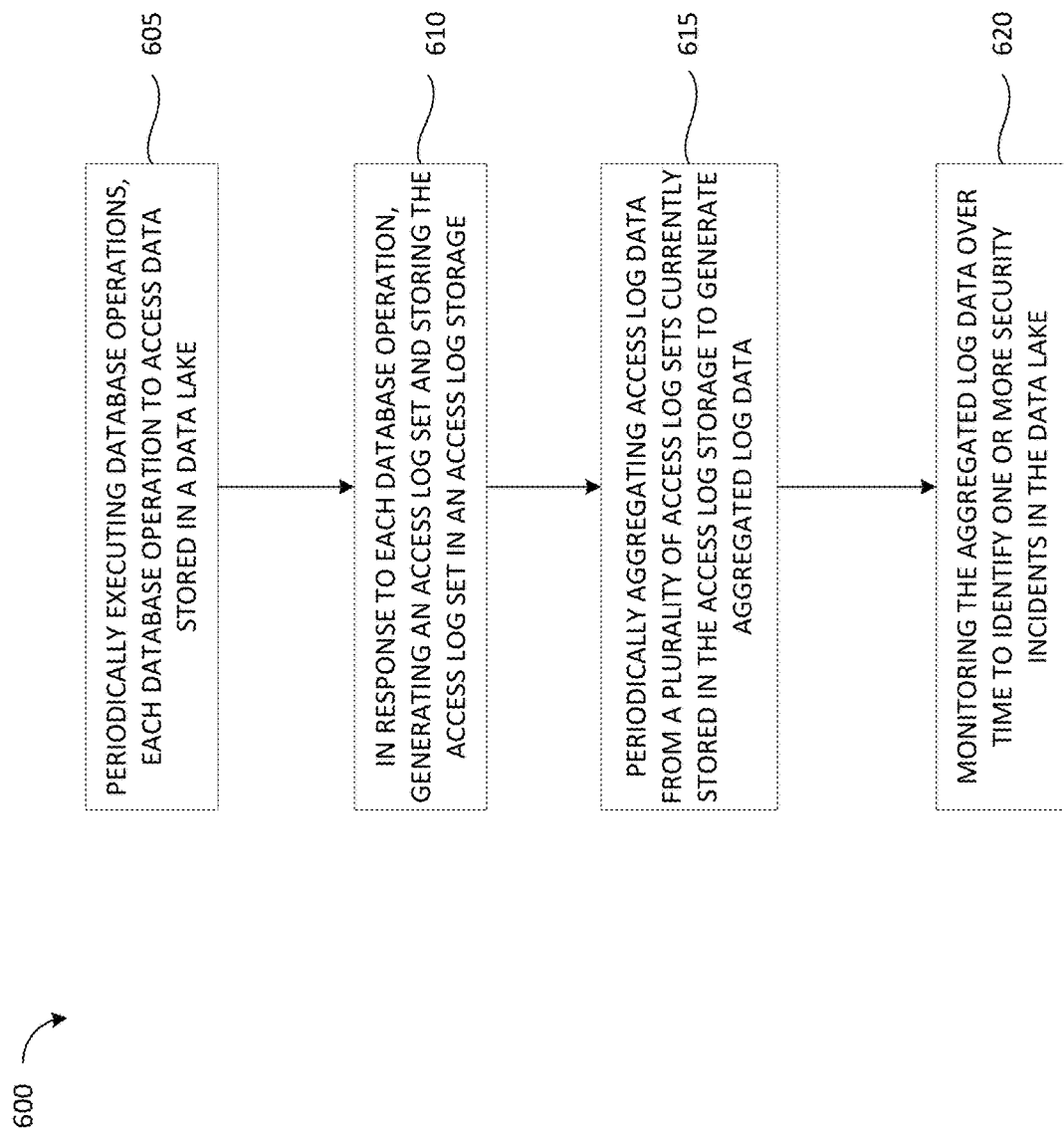
FIG. 6 is a flow diagram of a method for detecting security incidents in a data lake by aggregating log files generated by a monitoring program of the data lake and monitoring the aggregated log data, in accordance with some embodiments of the present disclosure.

FIG. 6 is a flow diagram of a method 600 for detecting security incidents and potential security vulnerabilities in a data lake by aggregating log files generated by a monitoring program of the data lake and monitoring the aggregated log data, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., monitoring server 120 illustrated in FIG. 2).

Referring also to FIG. 2, at block 605 the monitoring server 120 may execute database operations via query engine 150 and at block 610 may record object-level API activity, and generate detailed access log files (also referred to herein and shown as access logs 161 in FIG. 2) that provide log data about each database operation (e.g., a query) executed such as a user who made the query, a source from Which the query was made, a time at which the query was made, and what data was accessed, among other details as discussed in further detail with respect to FIG. 3. The monitoring program 160 may store the access logs 161 (also referred to herein as an access log set) within an access log storage 132 (e.g., an Amazon S3 bucket). The data in the data lake 130 may be hierarchical. For example, each data repository 131 may comprise a logical grouping of schemas and each schema may comprise a logical grouping of database objects (tables, views, etc.). Partitions may be sub folders of tables, in which data is organized inside of the data lake 130 and are among the most effective ways to reduce query time and costs associated with a data lake. Data may be saved according to partitions and in response to a query, the query engine 150 may scan only the relevant partitions—for example the last 7 days of data, or events of a specific type. The monitoring program 160 may allow a user to define different types of partitions for the purposes of aggregating access log data (discussed in further detail herein). Example partition types may include sequential partitions (e.g., date, time) and discrete partitions (e.g., event_type partitions, which may be one type of a static list of types with rare changes). In addition, a first partition may be defined with a particular type (e.g., sequential), and sub-partitions of the first partition may be defined with a different type (e.g., discrete). The memory 120A may store an event aggregation module 121 which may be executed by the processing device 120B in order to perform the event aggregation and other functions described herein.

At block 615, the processing device 120B (executing aggregation module 121) may aggregate log data from the access logs 161 currently stored in the access log storage 132 (thereby generating aggregated log data) based on a variety of different characteristics of the log data within the access logs 161 such as user (e.g., user, role, or service (including micro-service)), source (e.g., query engine, cloud service) time (aggregation can be done based on events that occurred during any appropriate time interval (e.g., minutes, hours)), the operation (event cause) which ultimately informs which prefixes/partitions/sub-partitions that were accessed, and target objects of the operation, including key prefixes that can represent a data lake table and scanned partitions/sub-partitions which may provide better granularity of the data access and qualitative monitoring. In addition, when aggregating based on time, in some embodiments the processing device 120B may use a more complex method such as time based clustering which groups sequences of records with small time differences. The processing device 120B may aggregate all of the access logs 161 stored in the access log storage 132 based on any combination of the above characteristics of the log data of the access logs 161 on any appropriate basis. For example, the processing device 120B may perform the aggregation at regular intervals (e.g., 5 minutes but can be any appropriate interval), or may perform the aggregation in response to certain event_type partitions being scanned.

FIG. 4 illustrates an example of aggregated log data 400, in accordance with some embodiments of the present disclosure. It should be noted that the aggregated log data 400 may represent log files from a single operation/query. As shown, the processing device 120B aggregated log data corresponding to 11,023 access log entries (events) into a single event. The processing device 120B aggregated the log data of the 11,023 events based on the source of the database operation which was the Athena query engine (Athena.amazonaws.com), and one sequential partition corresponding to events on Jun. 10, 2021 which was scanned together with 3 event_type sub-partitions (event types 1, 2, and 7). As shown in FIG. 4, 20 MB of data was transferred over the 11,023 access log entries.

At block 620, upon generating aggregated log data, the processing device 120B may monitor the aggregated log data (corresponding to events in the data lake 130) generated over time and identify/report on anomalies and security incidents. More specifically, the processing device 120B may monitor the following metrics over time for the different sources and targets: number of database operations, bytes transferred, number of accessed partitions, and number of unique accessed partitions/sub-partitions. In some embodiments, the processing device 120B may also monitor the number of operations, bytes transferred, and the number of accessed partitions for specific partitions. For example, the processing device 120B may monitor access metrics to a specific event_type by a particular source.

Figure 7:
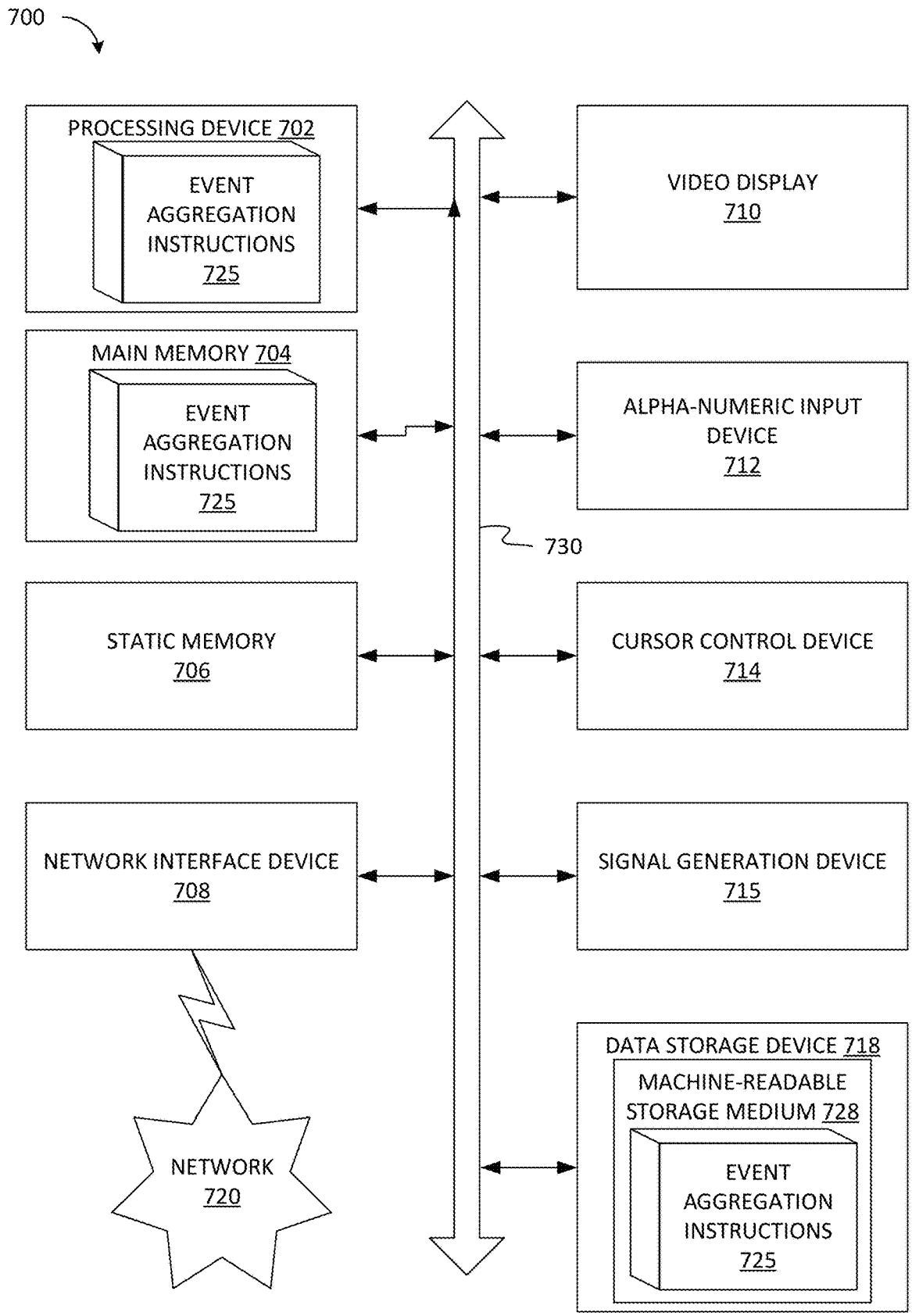
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein for detecting security incidents and possible security vulnerabilities in a data lake by aggregating log files generated by a monitoring program of the data lake and monitoring the aggregated log data.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The example computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute event aggregation instructions 725, for performing the operations and steps discussed herein.

The data storage device 715 may include a machine-readable storage medium 728, on which is stored one or more sets of event aggregation instructions 725 (e.g., software) embodying any one or more of the methodologies of functions described herein. The event aggregation instructions 725 may also reside, completely or at least partially, within the main memory 704 or within the processing device 702 during execution thereof by the computer system 700; the main memory 704 and the processing device 702 also constituting machine-readable storage media. The event aggregation instructions 725 may further be transmitted or received over a network 620 via the network interface device 708.

The machine-readable storage medium 728 may also be used to store instructions to perform a method for generating a high level security policy, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   periodically executing database operations, each database operation to access data stored in an object store;
   in response to each database operation, generating an access log set and storing the access log set in an access log storage;
   periodically aggregating, by a processing device, access log data from a plurality of access log sets currently stored in the access log storage to generate aggregated log data; and
   monitoring the aggregated log data over time to identify one or more security incidents of the object store, wherein
   the access log data from each of the plurality of access log sets corresponds to one or more access events, and includes a set of characteristics of each of the one or more access events, the set of characteristics include:
   a source from which the access event originated, a user, a role, or a group who initiated the access event, prefixes accessed by the access event, partitions accessed by the access event, sub-partitions accessed by the access event, a time of the access event, and a number of bytes transferred during the access event, and
   the access log data from each of the plurality of access log sets is aggregated based on a set of characteristics of each of the one or more access events from each of the plurality of access log sets.

2. The method of claim 1, wherein the aggregated log data represents a single event and indicates for the single event:
   a source from which the single event originated, a user, role, or group who initiated the single event, prefixes accessed by the single event, partitions accessed by the single event, sub-partitions accessed by the single event, a time of the single event, and a number of bytes transferred during the single event.

3. The method of claim 2, wherein monitoring the aggregated log data over time comprises:
   identifying security incidents based on one or more of a source from which the single event originated, a user, role, or group who initiated the single event, prefixes accessed by the single event, partitions accessed by the single event, sub-partitions accessed by the single event, a time of the single event, and a number of bytes transferred during the single event.

4. The method of claim 1, wherein the access log data from a plurality of access log sets currently stored in the access log storage is aggregated at regular intervals.

5. The method of claim 1, wherein the object store is a data lake comprising multiple data repositories.

6. A system comprising:
   a memory; and
   a processing device, operatively coupled to the memory, the processing device to:
   periodically execute database operations, each database operation to access data stored in an object store;
   in response to each database operation, generate an access log set and storing the access log set in an access log storage;
   periodically aggregate access log data from a plurality of access log sets currently stored in the access log storage to generate aggregated log data; and
   monitor the aggregated log data over time to identify one or more security incidents of the object store, wherein
   the access log data from each of the plurality of access log sets corresponds to one or more access events, and includes a set of characteristics of each of the one or more access events, the set of characteristics include:
   a source from which the access event originated, a user a role, or a group who initiated the access event, prefixes accessed by the access event, partitions accessed by the access event, sub-partitions accessed by the access event, a time of the access event, and a number of bytes transferred during the access event, and
   the access log data from each of the plurality of access log sets is aggregated based on a set of characteristics of each of the one or more access events from each of the plurality of access log sets.

7. The system of claim 6, wherein the aggregated log data represents a single event and indicates for the single event:
   a source from which the single event originated, a user, role, or group who initiated the single event, prefixes accessed by the single event, partitions accessed by the single event, sub-partitions accessed by the single event, a time of the single event, and a number of bytes transferred during the single event.

8. The system of claim 7, wherein to monitor the aggregated log data over time, the processing device is to:
   identify security incidents based on one or more of a source from which the single event originated, a user, role, or group who initiated the single event, prefixes accessed by the single event, partitions accessed by the single event, sub-partitions accessed by the single event, a time of the single event, and a number of bytes transferred during the single event.

9. The system of claim 6, wherein the access log data from a plurality of access log sets currently stored in the access log storage is aggregated at regular intervals.

10. The system of claim 6, wherein the object store is a data lake comprising multiple data repositories.

11. A non-transitory computer-readable medium having instructions stored thereon which, when executed by a processing device, cause the processing device to:
  periodically execute database operations, each database operation to access data stored in an object store;
  in response to each database operation, generate an access log set and storing the access log set in an access log storage;
  periodically aggregate, by the processing device, access log data from a plurality of access log sets currently stored in the access log storage to generate aggregated log data; and
  monitor the aggregated log data over time to identify one or more security incidents of the object store, wherein the access log data from each of the plurality of access log sets corresponds to one or more access events, and includes a set of characteristics of each of the one or more access events, the set of characteristics include:
  a source from which the access event originated, a user, a role, or a group who initiated the access event, prefixes accessed by the access event, partitions accessed by the access event, sub-partitions accessed by the access event, a time of the access event, and a number of bytes transferred during the access event, and
  the access log data from each of the plurality of access log sets is aggregated based on a set of characteristics of each of the one or more access events from each of the plurality of access log sets.

12. The non-transitory computer-readable medium of claim 11, wherein the aggregated log data represents a single event and indicates for the single event: a source from which the single event originated, a user, role, or group who initiated the single event, prefixes accessed by the single event, partitions accessed by the single event, sub-partitions accessed by the single event, a time of the single event, and a number of bytes transferred during the single event.

13. The non-transitory computer-readable medium of claim 12, wherein to monitor the aggregated log data over time, the processing device is to:
  identify security incidents based on one or more of a source from which the single event originated, a user, role, or group who initiated the single event, prefixes accessed by the single event, partitions accessed by the single event, sub-partitions accessed by the single event, a time of the single event, and a number of bytes transferred during the single event.

14. The non-transitory computer-readable medium of claim 11, wherein the access log data from a plurality of access log sets currently stored in the access log storage is aggregated at regular intervals.

* * * * *